US012377607B2

(12) United States Patent
Binek et al.

(10) Patent No.: US 12,377,607 B2
(45) Date of Patent: Aug. 5, 2025

(54) ROTATING RELATIVE RECOATER AND PART ORIENTATION

(71) Applicant: Hamilton Sundstrand Corporation, Charlotte, NC (US)

(72) Inventors: Lawrence Binek, Glastonbury, CT (US); David W. Morganson, Marlborough, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/724,183

(22) Filed: Apr. 19, 2022

(65) Prior Publication Data
US 2022/0234286 A1    Jul. 28, 2022

Related U.S. Application Data

(62) Division of application No. 16/166,958, filed on Oct. 22, 2018, now abandoned.

(51) Int. Cl.
*B29C 64/241* (2017.01)
*B22F 10/28* (2021.01)
(Continued)

(52) U.S. Cl.
CPC ............ *B29C 64/241* (2017.08); *B22F 10/28* (2021.01); *B22F 10/32* (2021.01); *B22F 10/38* (2021.01);
(Continued)

(58) Field of Classification Search
CPC ........ B22F 12/37; B22F 10/38; B29C 64/241; B29C 64/393
(Continued)

(56) References Cited

U.S. PATENT DOCUMENTS 8,021,138 B2    9/2011  Green
2007/0004028 A1*  1/2007  Lair .................. G01N 35/0099
                                                435/303.1
(Continued)

FOREIGN PATENT DOCUMENTS

WO    2019/139561 A1    7/2019
WO    2022/192368 A1    9/2022

OTHER PUBLICATIONS

Extended European Search Report dated Apr. 1, 2020, issued during the prosecution of European Patent Application No. EP 19204328.9.
(Continued)

*Primary Examiner* — Abbas Rashid
*Assistant Examiner* — Gregory C. Grosso
(74) *Attorney, Agent, or Firm* — Bachman & LaPointe, P.C.

(57) ABSTRACT

A system for additive manufacturing includes a build chamber including a sidewall and a build plate cooperating to define a build volume, wherein the build chamber is configured to house a part and unfused feedstock powder during a build. An energy source is mounted for movement relative to the build chamber, wherein the energy source is configured to selectively sinter the feedstock powder. A recoater is mounted for movement relative to the build chamber, wherein the recoater is configured to deposit successive layers of the feedstock powder for sintering to the part. A rotational actuator is in operable communication with the build chamber and the recoater configured to rotate the build chamber relative to the recoater.

14 Claims, 3 Drawing Sheets

(51) Int. Cl.
- *B22F 10/32* (2021.01)
- *B22F 10/38* (2021.01)
- *B22F 12/00* (2021.01)
- *B22F 12/37* (2021.01)
- *B22F 12/47* (2021.01)
- *B22F 12/67* (2021.01)
- *B22F 12/70* (2021.01)
- *B29C 64/153* (2017.01)
- *B29C 64/255* (2017.01)
- *B29C 64/268* (2017.01)
- *B29C 64/321* (2017.01)
- *B29C 64/393* (2017.01)
- *B33Y 10/00* (2015.01)
- *B33Y 30/00* (2015.01)
- *B33Y 40/00* (2020.01)

(52) U.S. Cl.
CPC ............ *B22F 12/226* (2021.01); *B22F 12/37* (2021.01); *B22F 12/47* (2021.01); *B22F 12/67* (2021.01); *B22F 12/70* (2021.01); *B29C 64/153* (2017.08); *B29C 64/255* (2017.08); *B29C 64/268* (2017.08); *B29C 64/321* (2017.08); *B29C 64/393* (2017.08); *B33Y 10/00* (2014.12); *B33Y 30/00* (2014.12); *B33Y 40/00* (2014.12)

(58) Field of Classification Search
USPC .......................................................... 264/497
See application file for complete search history.

(56) References Cited

U.S. PATENT DOCUMENTS

| | | |
|---|---|---|
| 2010/0125356 A1 | 5/2010 | Shkolnik et al. |
| 2011/0297081 A1 | 12/2011 | Green |
| 2018/0001553 A1* | 1/2018 | Buller ................. B28B 17/0081 |
| 2018/0099332 A1 | 4/2018 | Shaw |
| 2018/0186082 A1 | 7/2018 | Randhawa |
| 2018/0200963 A1* | 7/2018 | Bogdan, Jr. ........... B22F 10/322 |
| 2018/0345582 A1 | 12/2018 | Schade |
| 2019/0009333 A1 | 1/2019 | Fasano |
| 2019/0099809 A1* | 4/2019 | Hellestam ............. B29C 64/241 |
| 2019/0314894 A1 | 10/2019 | Pan |
| 2019/0323951 A1* | 10/2019 | Gold ....................... B22F 10/31 |
| 2020/0016655 A1 | 1/2020 | Crump et al. |
| 2020/0122389 A1 | 4/2020 | Binek et al. |
| 2021/0331399 A1 | 10/2021 | Seita et al. |

OTHER PUBLICATIONS

US Office Action dated Sep. 10, 2024 for U.S. Appl. No. 18/144,002.
European Search Reported dated Sep. 17, 2024 for European Patent Application No. 24174167.7.

* cited by examiner

ROTATING RELATIVE RECOATER AND PART ORIENTATION

CROSS REFERENCE TO RELATED APPLICATIONS

This application is a divisional of U.S. patent application Ser. No. 16/166,958, filed Oct. 22, 2018, the entire content of which is incorporated herein by reference.

BACKGROUND OF THE INVENTION

1. Field of the Invention

The present disclosure relates to additive manufacturing, and more particularly to controlling geometries in additive manufacturing techniques such as laser powder bed fusion, electron beam additive manufacturing, and the like.

2. Description of Related Art

Laser powder bed fusion additive manufacturing and electron beam additive manufacturing use directed energy in conjunction with powder feedstock to form a sintered structure. The energy source, e.g., the laser beam or electron beam, excites the target material to the point of phase-change. This melt-pool process, coupled with an active toolpath effectively welds a single layer of powder feedstock into a solid state. Once one layer has been formed, a recoater pushes a thin layer of powder feedstock across the build surface and the process repeats.

Build quality is often dependent on the orientation of the part with respect to the recoater. Due to the movement of the recoater over recently fused layers of the build, the properties of the part build can be negatively affected by part orientation. The part is traditionally positioned on a build plate in such a way as to avoid risk of recoater crash during the additive manufacturing process. Certain geometries are very sensitive to recoater orientation relative to the part. As such, part designs have to be developed knowing that certain features may build poorly and this limits the design space.

The conventional techniques have been considered satisfactory for their intended purpose. However, there is an ever present need for improved additive manufacturing systems and methods. This disclosure provides a solution for this need.

SUMMARY OF THE INVENTION

A system for additive manufacturing includes a build chamber including a sidewall and a build plate cooperating to define a build volume, wherein the build chamber is configured to house a part and unfused feedstock powder during a build. An energy source is mounted for movement relative to the build chamber, wherein the energy source is configured to selectively sinter the feedstock powder. A recoater is mounted for movement relative to the build chamber, wherein the recoater is configured to deposit successive layers of the feedstock powder for sintering to the part. A rotational actuator is in operable communication with the build chamber and the recoater configured to rotate the build chamber relative to the recoater.

A gas flow manifold can be operatively connected to a machine body for controlling gas composition in the build chamber, wherein the rotational actuator is configured to rotate the build chamber relative to the gas flow manifold and relative to the machine body. A linear actuator can be configured to move the build plate relative to the sidewall of the build chamber. The linear actuator and the rotary actuator can each include a respective encoder, wherein the encoders are operatively connected to index part location and rotation to provide clearance between the part and the recoater for rotation of the build chamber. The rotational actuator can include an encoder configured to index rotational part position, wherein an index value from the encoder is used to confirm approach angle of the recoater. A controller can be operatively connected to the energy source, to the recoater, and to the rotational actuator for controlling additive manufacturing of a part in the build chamber, wherein the controller is configured to select an approach angle on a layer by layer basis for the recoater relative to a build in the build chamber. The approach angle for each layer can be selected based on which approach angles provide a predetermined build quality.

The recoater can a soft recoater which is configured to not make contact with a part in the build chamber during a build. The controller can be configured to select an approach angle on a layer by layer basis to reduce or eliminate ripples forming in the part due to interactions between the recoater and a melt pool formed in the part as the energy source sinters feedstock powder to the part. The controller can be configured to select an approach angle on a layer by layer basis to reduce or eliminate cumulative build errors forming in the part due to interactions between the recoater and a melt pool formed in the part as the energy source sinters feedstock powder to the part.

The build plate and the sidewall of the build chamber can be configured to rotate together with a part during a build in the build chamber, and to rotate the part and unfused feedstock powder together in the build chamber to avoid relative rotation of the part and unfused feedstock powder, e.g., so the feedstock powder in the build chamber remains undisturbed. The rotational actuator can be configured to rotate the build chamber clockwise and counter-clockwise. The build plate can have a non-circular shape, and the sidewall of the build chamber can conform to the non-circular shape.

A method of additive manufacturing includes depositing feedstock powder with a recoater in a build chamber, selectively sintering a portion of the feedstock powder deposited by the recoater to a part in the build chamber, rotating the part, the build chamber, and unsintered feedstock powder in the build chamber together relative to the recoater, and repeating the depositing, the selectively sintering, and the rotating to form an additively manufactured part layer by layer in the build chamber.

The method includes controlling gas composition in the build chamber using a gas flow manifold, wherein the rotational actuator is configured to rotate the build chamber relative to the gas flow manifold. The method includes indexing part location and rotation to provide clearance between the recoater and the part for rotation of the build chamber. The method includes using an index value from an encoder to confirm approach angle of the recoater. The method includes selecting an approach angle on a layer by layer basis for the recoater relative to a build in the build chamber, wherein the approach angle for each layer is selected based on which approach angles provide a predetermined build quality.

The recoater can be a soft recoater and the method can include avoiding contact between the soft recoater with a part in the build chamber during a build, wherein avoiding contact includes selecting an approach angle on a layer by layer basis to reduce or eliminate ripples forming in the part due to interactions between the recoater and a melt pool formed in sintering feedstock powder to the part. The method can include selecting an approach angle on a layer by layer basis to reduce or eliminate cumulative build errors forming in the part due to interactions between the recoater and a melt pool formed in the part in sintering feedstock powder to the part.

Rotating the part, the build chamber, and unsintered feedstock can include rotating the part and unfused feedstock powder together to avoid relative rotation of the part and unfused feedstock powder, e.g., so the feedstock powder in the build chamber remains undisturbed. Rotating the part, the build chamber, and unsintered feedstock can include rotating the build chamber clockwise and counter-clockwise.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
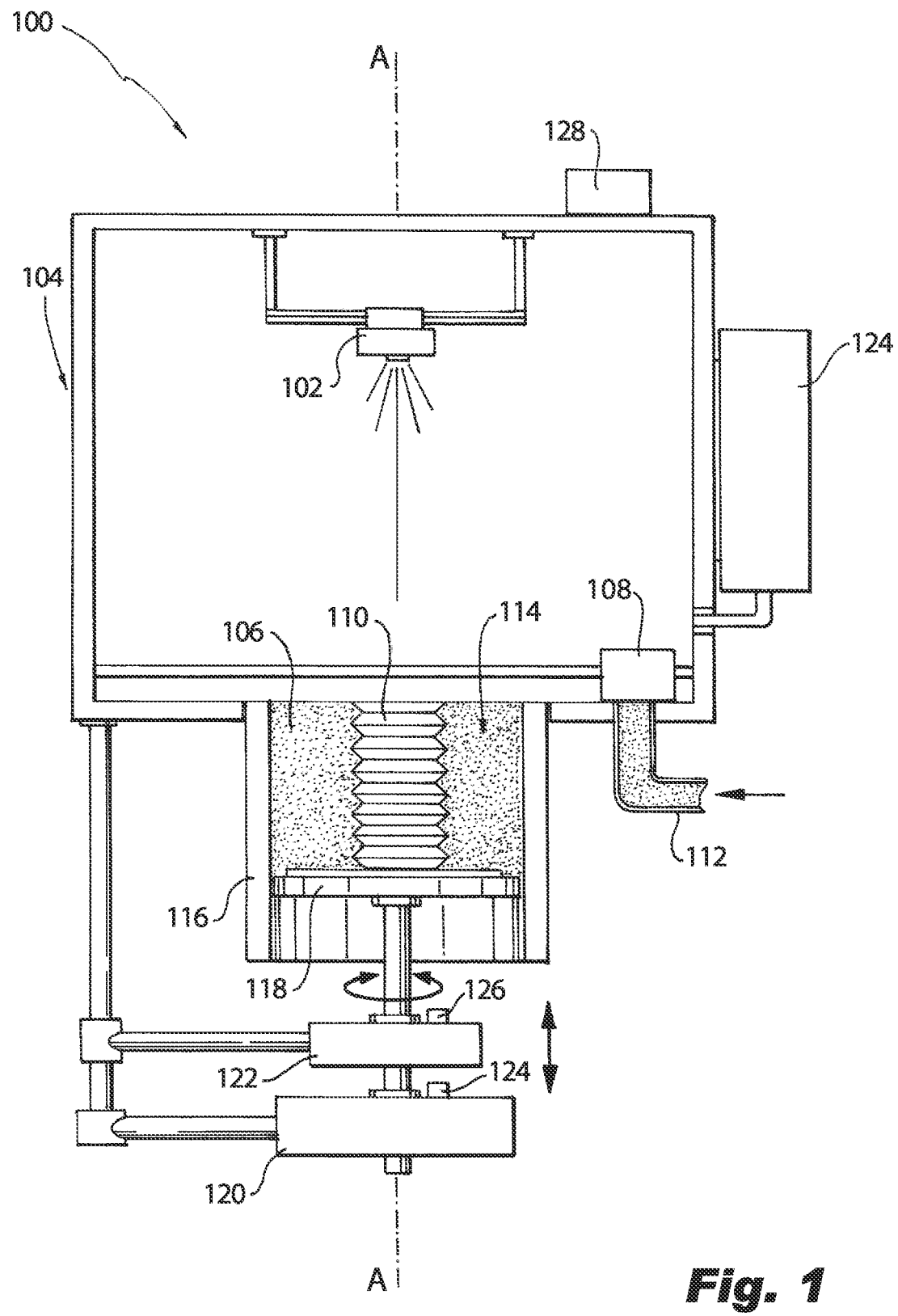
FIG. 1 is a schematic side elevation view of an exemplary embodiment of a system constructed in accordance with the present disclosure, showing a build in process within the build chamber.

Reference will now be made to the drawings wherein like reference numerals identify similar structural features or aspects of the subject disclosure. For purposes of explanation and illustration, and not limitation, a partial view of an exemplary embodiment of a system for additive manufacturing in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to control build quality and reduce cumulative build errors in additive manufacturing.

The system 100 includes an energy source 102, e.g., a laser, electron beam, or any other suitable directed source of sintering energy, mounted for movement, e.g., linear or curved movement, relative to a machine body 104, e.g., two-dimensional movement left and right and into and out of the viewing plane as oriented in FIG. 1. The energy source 105 is configured to selectively sinter feedstock powder 106. A recoater 108 is mounted for movement, e.g., linear movement, relative to the machine body, e.g. for movement left and right as oriented in FIG. 1. The recoater 108 is configured to deposit successive layers of feedstock powder 106 for sintering to a part 110, e.g., by sweeping a thin layer of feedstock powder from a dosing chamber 112 over the top of part 110 and the feedstock powder 106 in the build chamber 114 after each layer of the part 110 is sintered. The build chamber 114 includes a sidewall 116 and a build plate 118 cooperating with one another to define a build volume, e.g., the volume that is filled with feedstock powder 106 and the part 110 in FIG. 1. The build chamber 114 houses the part 110 and the unfused feedstock powder 106 during a build. After each layer of part 110 is sintered, a linear actuator 120 lowers the build plate 118, the unfused feedstock powder 106, and the part 110 slightly to create a clearance at the top of the part 110 for recoater 108 to deposit the next layer of feedstock powder over the part 110 for sintering the next layer of the part 110. The movement direction of the build plate 118 is indicated by the vertical double arrow in FIG. 1. The linear actuator 120 is configured to move the build plate 118 relative to the sidewall 116 of the build chamber 114.

A rotational actuator 122 operatively connects between the machine body 104 and the build chamber 114 for rotating the build chamber 114 relative to the machine body 104 and recoater 108. The direction of rotation of the build chamber 114 due to the rotational actuator 122 is about the axis A and is indicated schematically in FIG. 1 by the circular double arrow, wherein the axis A aligned to the build direction, i.e., the axis A is aligned with the direction in which the part 110 grows layer by layer during the build. As depicted in FIG. 1, the linear actuator 120 lifts or lowers the rotary actuator together with the build plate, however it also contemplated that mechanical order could be different, e.g., wherein the rotational actuator 122 rotates the linear actuator together with rotating the build chamber 114. A gas flow manifold 124 is operatively connected to the machine body 104 for controlling gas composition in the build chamber 114. The rotational actuator 122 is configured to rotate the build chamber 114 relative to the gas flow manifold 124.

The linear actuator 120 and the rotary actuator 122 each include a respective encoder 124, 126. The encoders 124, 126 are operatively connected to index part location and rotation of the part 110, e.g. relative to the machine body 104 and recoater 108, to provide clearance between the part 110 and the recoater 108 for rotation of the build chamber 114 relative to the recoater 108. The encoder 126 of the rotational actuator 122 is configured to index rotational part position of the build chamber 114 and the part 110, wherein an index value from the encoder 126 is used to confirm approach angle θ of the recoater (the approach angle θ is identified in FIGS. 2-3). A controller 128 is operatively connected to the energy source 102, to the recoater 108, to the gas flow manifold 124, to the linear actuator 120, to the encoders 124, 126, and to the rotational actuator 122 for controlling additive manufacturing of the part 110 in the build chamber 114.

Figure 2:
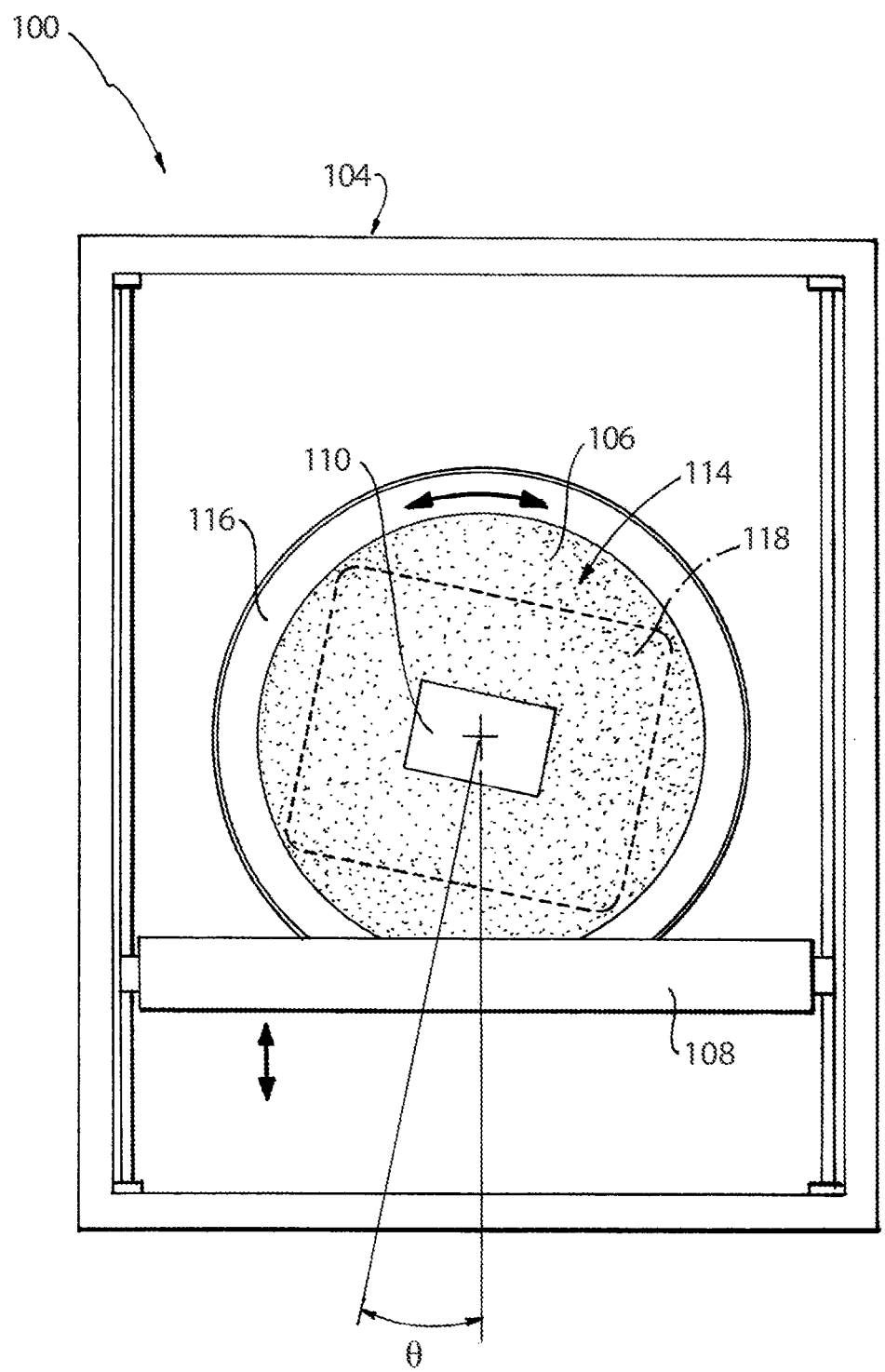
FIG. 2 is a schematic plan view of a portion of the system of FIG. 1, showing one approach angle of the recoater.
Figure 3:
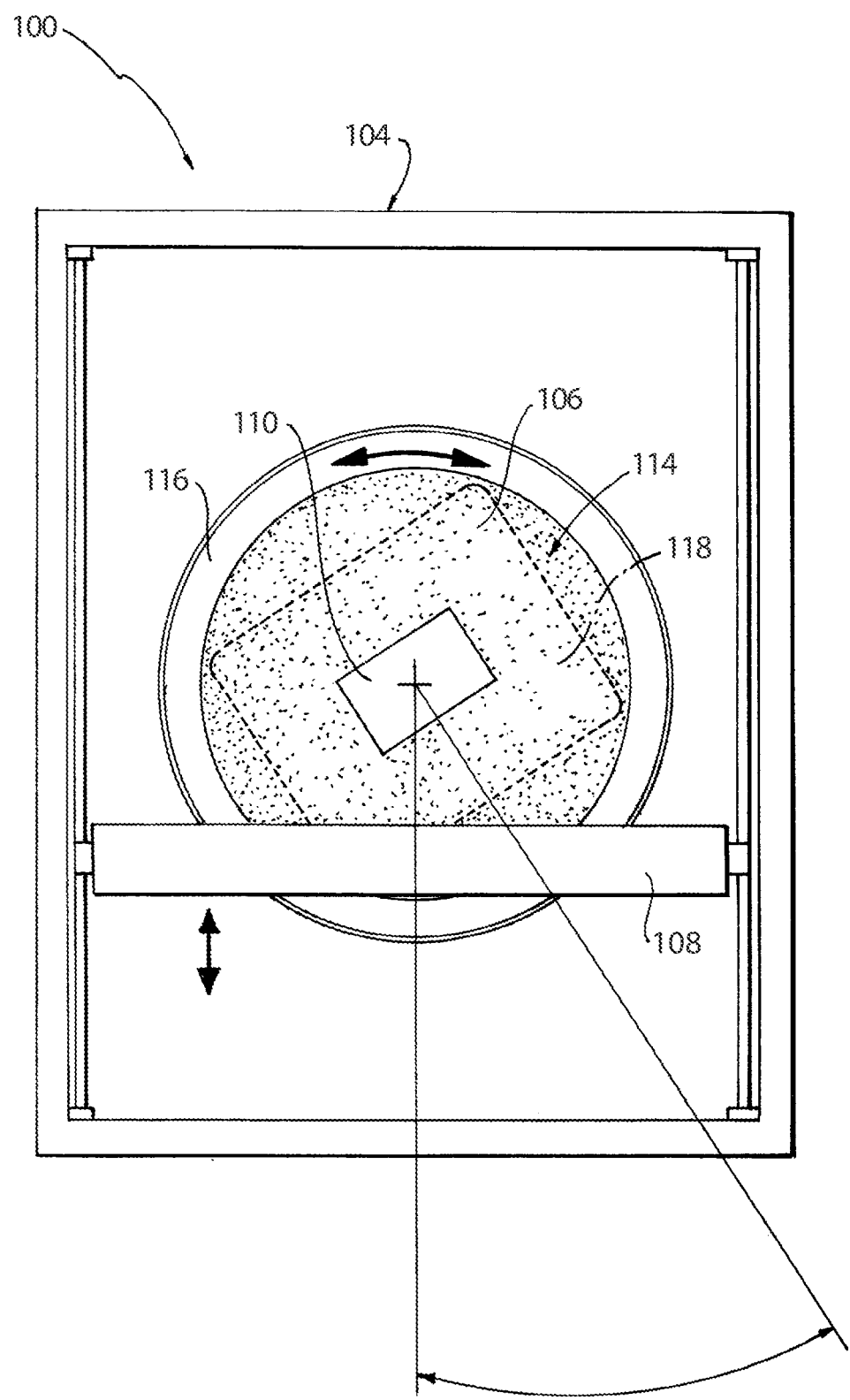
FIG. 3 is a schematic plan view of a portion of the system of FIG. 1, showing another approach angle of the recoater.

With reference to FIGS. 2-3 the controller 128 (shown in FIG. 1) is configured, e.g., with machine readable instructions that cause the controller to select an approach angle θ on a layer by layer basis for the recoater 108 relative to a build or part 110 in the build chamber 114. The approach angle θ for each layer of the part 110 is selected based on which approach angles provide a predetermined build quality for the part 110. For example, at each layer of the part 110, the approach angle θ for the part 110 relative to the recoater 108 can be selected to minimize cumulative build errors that would otherwise result from having a constant relative orientation of the part 110 to the recoater 108. As shown in FIG. 1, the controller 128 can control the rotational actuator 122 to rotate the build chamber 114 and the part 110 to the given approach angle θ (shown in FIGS. 2-3) at a given layer of the part 110 before the recoater 108 deposits the next layer of feedstock powder 106.

With continued reference to FIGS. 1-3, the recoater 108 is a soft recoater which is configured to not make contact with the part 110 in the build chamber 114 during a build. The controller 128 can be configured, e.g., with a build quality algorithm in machine readable instructions, to select the approach angle θ on a layer by layer basis for the part 110 to reduce or eliminate ripples forming in the part 110 due to interactions between the recoater 108 and a melt pool formed in the part 110 as the energy source 102 sinters feedstock powder 106 to the part 110. It is also contemplated that the controller 128 can be configured, e.g., with a build quality algorithm in machine readable instructions, to select an approach angle θ on a layer by layer basis for the part 110 to reduce or eliminate cumulative build errors forming in the part 110 due to interactions between the recoater 108 and the melt pool formed in the part 110 as the energy source 102 sinters feedstock powder 106 to the part 110.

With reference to FIGS. 2-3, the build plate 118 and the sidewall 116 of the build chamber 114 are configured to rotate together with the part 110 during a build in the build chamber 114. This rotates the part 110 and the unfused feedstock powder 106 in the build chamber 114 together to avoid relative rotation of the part 110 and the unfused feedstock powder 106, e.g., so the feedstock powder 106 in the build chamber 114 remains undisturbed during rotation. The rotational actuator 122 (shown in FIG. 1) is configured to rotate the build chamber 114 clockwise relative to the recoater 108 as shown in FIG. 3 and counter-clockwise relative to the recoater 108 as shown in FIG. 2, and the approach angle θ between the recoater 108 and the part 110 can be any angle from 0° to 360°. The build plate 118 has circular shape, but as shown in FIGS. 2 and 3 in the dotted lines, this is a rectangle with rounded corners, however, any suitable shape can be used without departing from the scope of this disclosure. The sidewall 116 of the build chamber 114 conforms to the shape of the build plate 118. If a circular build plate 118 is used, the build plate 118 and sidewall 116 can be mechanically registered to keep them from rotating relative to one another.

While disclosed herein in the exemplary context of having the build chamber 114 rotate relative to the machine body 104, those skilled in the art will readily appreciate that it is possible to rotate the recoater relative to the machine body 104 to change the approach angle of the recoater 108, without departing from the scope of this disclosure.

The ability to rotate the part after each layer of feedstock powder is sintered to the part allows designers to avoid the traditional problems when the sintered melt pool pulling in more feedstock powder material than intended. Traditionally in soft recoater systems, this melt pool phenomenon in one layer causes ripples in the surfaces of parts, and the errors in the part can be cumulative as the part is built layer by layer. The ability to change the approach angle for the recoater on each layer can disrupt the ripple patterns and thus avoid cumulative errors. Since the powder and part can be rotated together, errors arising from disturbing the unsintered feedstock powder can be avoided. Potential advantages of systems and methods as disclosed herein include the following. By reducing build failure risk with respect to part orientation, additive manufacturing part designers can be enabled to develop more complex part designs. For example, heat exchangers with complex internal fins and passages can benefit from this capability, whereas with traditional techniques such builds would have a much higher risk of build failure.

The methods and systems of the present disclosure, as described above and shown in the drawings, provide for additive with superior properties including improved build quality and reduced cumulative error relative to traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of additive manufacturing comprising:
    depositing feedstock powder in a build chamber with a recoater;
    selectively sintering a portion of the feedstock powder deposited by the recoater to a part in the build chamber;
    rotating the part, the build chamber, and unsintered feedstock powder in the build chamber together relative to the recoater;
    repeating the depositing, the selectively sintering, and the rotating to form an additively manufactured part layer by layer in the build chamber;
    indexing part location and rotation to provide clearance between the recoater and the part for rotation of the build chamber using an index value from an encoder to confirm approach angle of the recoater; and
    selecting an approach angle on a layer by layer basis for the recoater relative to a build in the build chamber, wherein the approach angle for each layer is selected based on which approach angles provide a predetermined build quality; wherein the approach angle is selected based on each indexing value.

2. The method as recited in claim 1, further comprising controlling gas composition in the build chamber using a gas flow manifold, wherein a rotational actuator is configured to rotate the build chamber relative to the gas flow manifold.

3. The method as recited in claim 1, wherein the recoater is a soft recoater and further comprising avoiding contact between the soft recoater with a part in the build chamber during a build, wherein avoiding contact includes selecting an approach angle on a layer by layer basis to reduce or eliminate ripples forming in the part due to interactions between the recoater and a melt pool formed in sintering feedstock powder to the part.

4. The method as recited in claim 1, wherein the recoater is a soft recoater and further comprising avoiding contact between the soft recoater with a part in the build chamber during a build, wherein avoiding contact includes selecting an approach angle on a layer by layer basis to reduce or eliminate cumulative build errors forming in the part due to interactions between the recoater and a melt pool formed in the part in sintering feedstock powder to the part.

5. The method as recited in claim 4, wherein rotating the part, the build chamber, and unsintered feedstock includes rotating the part and unsintered feedstock together to avoid relative rotation of the part and unfused feedstock powder.

6. The method as recited in claim 5, wherein rotating the part, the build chamber, and unsintered feedstock includes rotating the build chamber clockwise and counter-clockwise.

7. The method as recited in claim 6, wherein a build plate of the build chamber has a non-circular shape, and wherein the sidewall of the build chamber conforms to the non-circular shape.

8. The method as recited in claim 1, wherein rotating the part, the build chamber, and unsintered feedstock includes rotating the part and unsintered feedstock together to avoid relative rotation of the part and unfused feedstock powder.

9. The method as recited in claim 1, wherein rotating the part, the build chamber, and unsintered feedstock includes rotating the build chamber clockwise and counter-clockwise.

10. The method as recited in claim 1, wherein a build plate of the build chamber has a non-circular shape, and wherein the sidewall of the build chamber conforms to the non-circular shape.

11. The method as recited in claim 10, wherein the selecting is done by a controller individually for each layer.

12. The method as recited in claim 1, wherein the selecting is done by a controller individually for each layer.

13. A method of additive manufacturing comprising: depositing feedstock powder in a build chamber with a recoater; selectively sintering a portion of the feedstock powder deposited by the recoater to a part in the build chamber; rotating the part, the build chamber, and unsintered feedstock powder in the build chamber together relative to the recoater; repeating the depositing, the selectively sintering, and the rotating to form an additively manufactured part layer by layer in the build chamber; indexing part location and rotation to provide clearance between the recoater and the part for rotation of the build chamber using an index value from an encoder to confirm approach angle of the recoater; and for each layer, a controller selecting an approach angle for the recoater relative to a build in the build chamber, wherein the approach angle for each layer is selected based on which approach angle for said layer reduces ripples in the part.

14. The method as recited in claim 13, wherein the selecting is done by the controller individually for each layer.

\* \* \* \* \*